United States Patent [19]
Henricson et al.

[11] Patent Number: 5,323,914
[45] Date of Patent: Jun. 28, 1994

[54] METHOD OF AND APPARATUS FOR SEPARATING HEAVY IMPURITIES FROM FIBER SUSPENSIONS IN CONNECTION WITH PUMPING

[75] Inventors: Kaj Henricson, Kotka; Raimo Pitkanen, Karhula; Pentti Vikio, Kerimaki, all of Finland

[73] Assignee: A. Ahlstrom Corporation, Karhula, Finland

[21] Appl. No.: 773,814

[22] PCT Filed: Jun. 6, 1990

[86] PCT No.: PCT/FI90/00154
§ 371 Date: Feb. 6, 1992
§ 102(e) Date: Feb. 6, 1992

[87] PCT Pub. No.: WO90/15183
PCT Pub. Date: Dec. 13, 1990

[30] Foreign Application Priority Data
Jun. 8, 1989 [FI] Finland .................................. 892807

[51] Int. Cl.⁵ ............................................... B04B 5/12
[52] U.S. Cl. ................................... 209/210; 162/55; 210/787; 210/512.3
[58] Field of Search ............... 209/211, 273, 156, 250, 209/283; 162/55; 210/512.1, 512.3, 787

[56] References Cited

U.S. PATENT DOCUMENTS

| | | | |
|---|---|---|---|
| 4,443,331 | 4/1984 | Armand | 209/211 |
| 4,594,152 | 6/1986 | Gullichsen | 209/273 |
| 4,601,819 | 7/1986 | Pellhammer et al. | 209/273 |
| 4,680,108 | 7/1987 | Abs | 162/55 |
| 5,051,168 | 9/1991 | Hautala | 209/273 |

FOREIGN PATENT DOCUMENTS

| | | | |
|---|---|---|---|
| 791194 | 12/1935 | France | 209/211 |
| 377353 | 7/1932 | United Kingdom | 210/512.3 |

*Primary Examiner*—H. Grant Skaggs
*Attorney, Agent, or Firm*—Cohen, Pontani, Lieberman & Pavane

[57] ABSTRACT

A method and an apparatus for separating heavy impurities from a fiber suspension include a centrifugal pump capable of separating heavy impurities towards the periphery of the interior chamber of the pump. The fiber suspension is caused to rotate in the interior chamber so as to urge the suspension downstream as well as separate the impurities towards the periphery of the chamber where they can be collected.

8 Claims, 4 Drawing Sheets

METHOD OF AND APPARATUS FOR SEPARATING HEAVY IMPURITIES FROM FIBER SUSPENSIONS IN CONNECTION WITH PUMPING

FIELD OF THE INVENTION

The present invention relates to a method of and an apparatus for separating heavy impurities from fiber suspensions in a centrifugal pump. The method and the apparatus of the invention are particularly suitable for treatment of fiber suspensions in the wood processing industry.

BACKGROUND OF THE INVENTION

Paper stock (stock) is a suspension of fiber in water. The consistency of stock is measured in the percentage of fiber therein. Stock treated in the pulp and paper industry frequently contains heavy impurities, such as scraps of metal or particles of sand. Sand and metal are often transported to the mill with raw materials such as wood or waste paper. In addition, metal may also originate from the various processing devices in the mill or may be included in waste paper in the form of staples or paper clips.

The presence of these heavy impurities in these raw materials is very detrimental to the pulp and paper making process and therefore must be removed. In particular, sand and metal cause problems by wearing out the devices utilized in pulp and paper processes. Further, these impurities accumulate and clog these devices so as to render these devices susceptible to failure.

Heavy particles are usually separated from the stock by various vortex separators which have been designed according the various applications. Two exemplary types of separators are discussed below.

A conventional low consistency separator, sometimes referred to as a cleaner, usually operates at a consistency range of less than about 1% and contains a vortex separator similar to a device referenced by numeral 10 in FIG. 1. Stock is introduced at a high speed via a tangential inlet 12 to a cylindrical portion 14 of the separator so that heavy particles accumulate at the wall thereof and move along a spiral path down into a conical portion 16 of the separator. These, particles are then ejected from the bottom of the separator via an outlet 18. The purified lighter stock which is collected around the axis of the separator 10, rises up and is discharged via an outlet 20 in the upper end of separator 10. This type of vortex separator has two disadvantages, namely it requires operation with low consistency stock and thus exhibits high energy consumption. The energy consumption is high due to the low operational consistency of the stock which inherently requires the pumping of large amounts of water through the vortex cleaner and the significant amount of pressure loss within the apparatus.

Another cleaner is generally used for separating scrap and sand from high consistency stock, in the range of 3%-5%. As illustrated in FIG. 2., high consistency cleaner 30 is identical with a conventional vortex cleaner (FIG. 1) except that it includes a rotor 32. The rotor 32 usually rotates at the upper end of a conical portion 34 of cleaner 30, close to an inlet 36 and an accept discharge 38. The rotor 32 has two functions. One of the functions is to move the stock so as to prevent, the fiber network from becoming entangled and thus interfere with the scrap and sand particles from easily moving through the suspension. The second function of the rotor 32 is to subject the stock suspension to a fast circular movement so as to create a centrifugal force which forces the heavy particles to the periphery of the separator. The drawbacks of the cleaner are its large size and high energy consumption when one strives for an adequate separation efficiency. Further, the cleaner, despite its rotor, is not capable of creating pressure. In other words, the cleaner cannot advance the stock. Consequently, the stock to be cleaned must be introduced into the cleaner at such a high pressure that the stock can upon discharge retain enough pressure so as to move to the next processing step under the urging of such pressure.

Swedish Patent 457 614 discloses a turbocyclone apparatus, in which the suspension is fed through a tangential feed inlet. The suspension flows underneath a stationary spirally formed plate, which directs the suspension in a spiral path down along the converging walls of the cyclone. Thereafter the pulp is subjected to axial forces by means of a rotating rotor for increasing the separation efficiency. The lighter particles accumulate in the center of the cyclone and flow upwards along a channel within the hollow shaft of the rotor, while the heavier particles are removed from the bottom portion of the cyclone. The shaft is provided with openings in its upper portion for allowing the lighter particles to flow therethrough and into the tangential outlet of the cyclone.

It is an object of the present invention to overcome or to minimize the problems of the prior art apparatus in separating sand and scrap from stock. The apparatus of the present invention is small and its energy consumption is low.

SUMMARY OF THE INVENTION

The method of the present invention comprises generating rotary movement on the fiber suspension by the rotary action of a centrifugal pump and utilizing that rotary movement for separating heavy impurities from the suspension to be pumped by causing the impurities to move to the periphery of the rotary flow and removing the impurities from the pump as a flow separate from the rest of the suspension.

The apparatus of the present invention is characterized in that the pump housing has at least one discharge opening for removal of heavy impurities collected at the wall of the housing.

BRIEF DESCRIPTION OF THE DRAWINGS

The present invention is described in more detail by way of example, with reference to the accompanying drawings, in which.

DESCRIPTION OF THE PRESENTLY PREFERRED EMBODIMENTS

Figure 1:
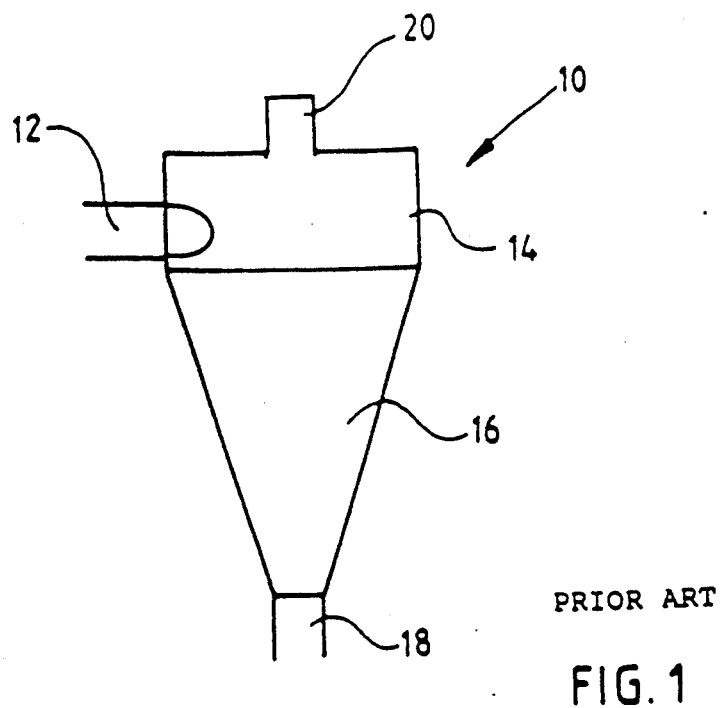
FIG. 1 illustrates a prior art vortex separator used at low consistencies.
Figure 2:
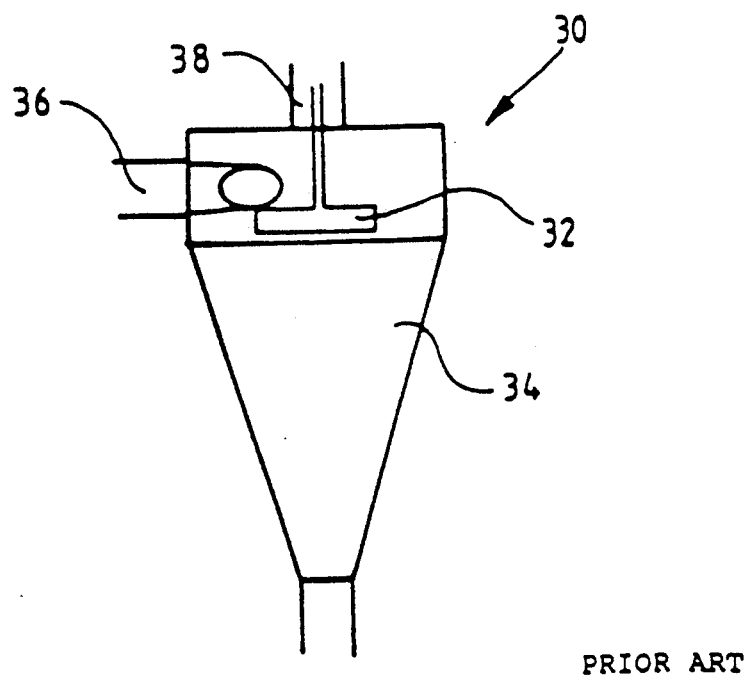
FIG. 2 illustrates a prior art vortex separator used at somewhat higher consistencies.
Figure 3:
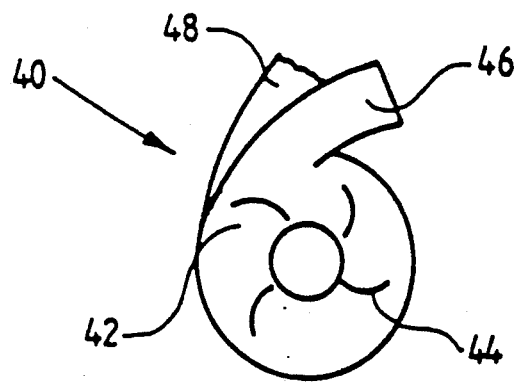
FIG. 3 illustrates a sectional view transverse to the rotary axis of a preferred embodiment of an apparatus according to the present invention.

FIGS. 1 and 2 illustrate prior art vortex separators which have been described above. FIG. 3 illustrates one form of the present invention which includes a centrifugal pump 40 having a pump housing 42, an impeller 44, a stock discharge connection or pressure outlet 46, and a discharge connection or outlet 48 for heavy particles. The impeller 44, while it rotates at a high speed in the pump housing 42, subjects the stock to be pumped to a highspeed rotary movement. The rotary movement, and the centrifugal force created thereby, causes the suspension to circulate in the pump housing 42 for at least one cycle and thus causes the heavy particles to migrate towards the outer periphery of the pump housing 42. By designing the pump housing so as to cause the heavy particles to be collected and to flow towards the discharge connection 48, the separation of heavy particles from the stock can be achieved without the need to subject the stock to a centrifugal force in a separate apparatus. Thus both the separation of heavy particles and an increase in stock pressure to urge the stock forward, can be achieved in one and the same apparatus. Moreover, the pump, as illustrated in FIG. 3, can be used in many partial processes of the pulp and paper industry as described in more detail below.

Figure 4:
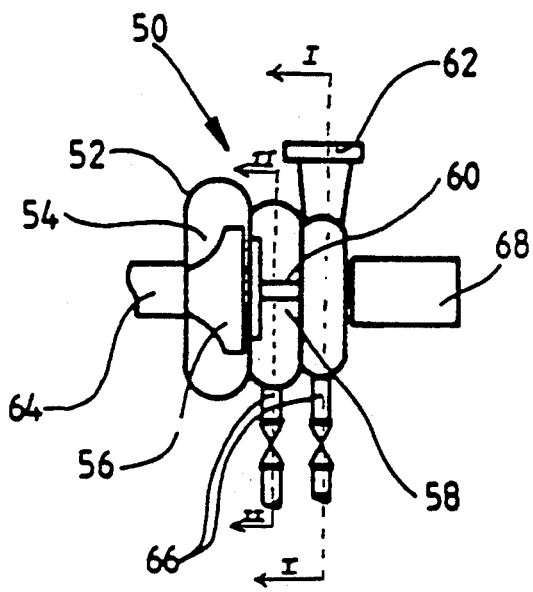
FIG. 4 illustrates a diagrammatic view in a section parallel to the rotary axis of another preferred embodiment of an apparatus according to the present invention.
Figure 4A:
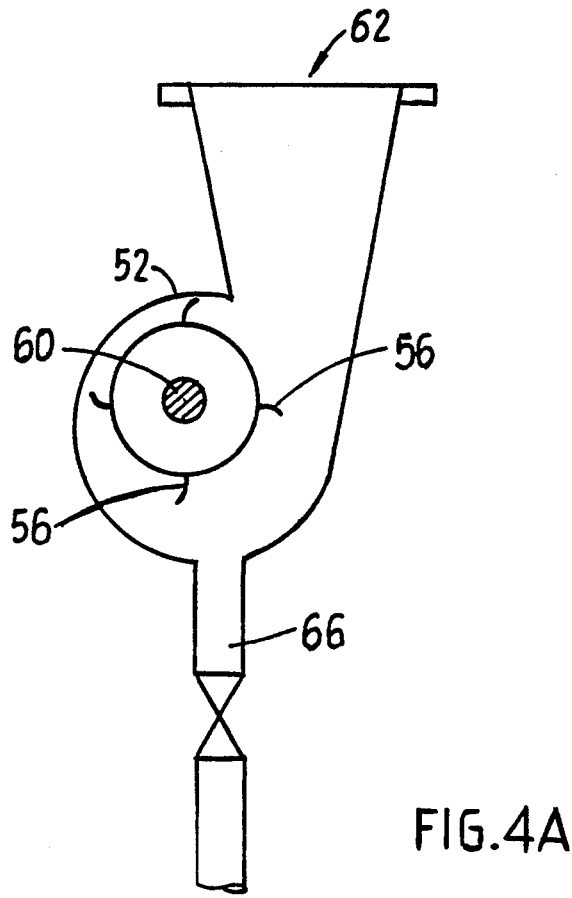
FIG. 4A illustrates a sectional view along I—I of a volute portion of a preferred embodiment as shown in FIG. 4.
Figure 4B:
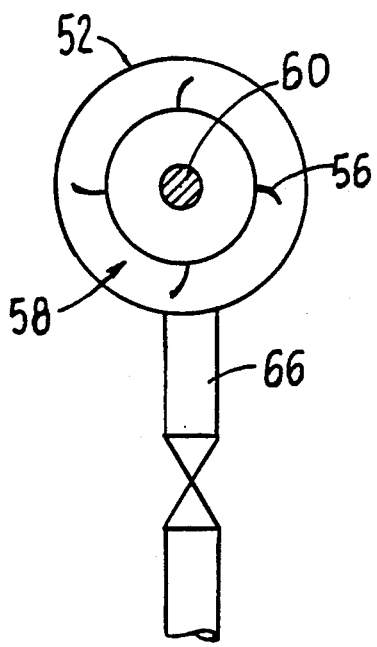
FIG. 4B illustrates a sectional view along II—II of an annular portion of a preferred embodiment as shown in FIG. 4.

FIG. 4 illustrates yet another preferred embodiment of the present invention in which a centrifugal pump 50 having a pump housing 52 has a first portion 54 wherein an impeller 56 is disposed, and a second portion 58 wherein the seals and bearings of a pump shaft 60 are included. The shape of the first portion 54 of the housing 52 is substantially identical with the shape of a conventional centrifugal pump housing with the exception that the housing portion 54 does not have a pressure outlet. Rather, the first portion 54 continues either as a volute (see FIG. 4A) which winds around shaft 60 one or more cycles, or as a curving spiral housing, or as successive annular zones (see FIGS. 4 and 4B) to form the second portion 58 of housing 52 which ends at a tangential pressure outlet 62 of the pump. The first portion 54 of the pump housing 52 is provided with an inlet or a suction opening or connection 64. It is a characteristic feature of portions 54 and 58 of the pump housing 52 that the cross-sectional area thereof slightly diminishes towards the pressure outlet 62 so as to increase the rotational velocity of the stock to be cleaned or pumped in the spiral. Such a design improves the separation efficiency of the pump while the pressure of the stock is substantially unchanged even though heavy impurities are removed via one or more discharge outlets 66 (here shown as two) included in the spiral. The decrease in cross-sectional area described above can be carried out either as illustrated in FIG. 4, whereby the seals and bearings of the pump are enclosed in a substantially cylindrical casing and wherein the diameter of the spiral decreases towards the pressure outlet, or by adapting the casing, which is conical and encloses the bearings and seals, to open towards the pump drive motor 68, in which case the diameter of the pump spiral can remain unchanged along the entire length thereof.

Figure 4C:
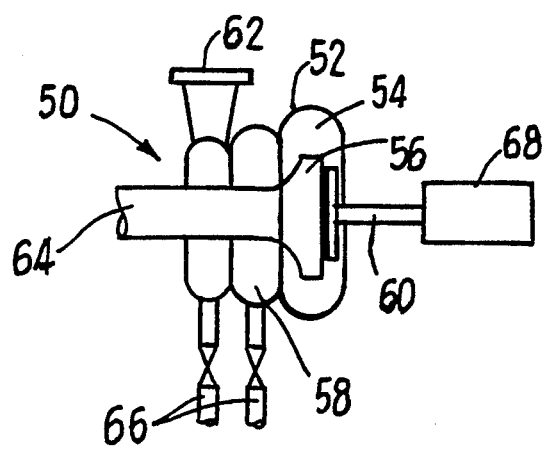
FIG. 4C illustrates a diagrammatic view of another preferred embodiment wherein the housing is reversed relative to the housing shown in FIG. 4.

The embodiment illustrated in FIG. 4 can also be modified so that the direction of the tapered end of the helical housing is inverted or reversed and the pump housing is substantially arranged around the suction opening of the pump. (see FIG. 4C) In this manner, the suction opening can remain cylindrical, or if necessary it can made conical. This configuration greatly facilitates the maintenance of the pump bearings and the seals and facilitates operational control of the pump because the bearings and the seals are easily accessible and not inside the spiral housing.

In an alternative embodiment of the present invention, the spiral housing is replaced by one or more annular housing portions. Heavy particles circulate within the wall of the annular housing portion which prevents these heavy particles from traveling downstream from the impeller towards the pressure outlet opening. These heavy particles continue to circulate within these annular portion until they are discharged therefrom in a manner now to be described.

To remove the heavy particles, the volute, the spiral housing, or the annular portions of the housing are provided with discharge openings or connections through which the stock portion containing the heavy particles is removed from the main flow and is guided to another corresponding separator, such as a prior art cyclone. The accept from this secondary separation device, i.e., the prior art cyclone, can be recycled either to the inlet of the primary stage separator or, if the discharge pressure of the secondary stage is adequate, directly to the accept flow of the primary stage. By providing the discharge outlets with either a suitable counter-pressure or an adequately narrow opening, the pressure generated within the pump cannot significantly "leak" through this discharge opening.

Figure 5:
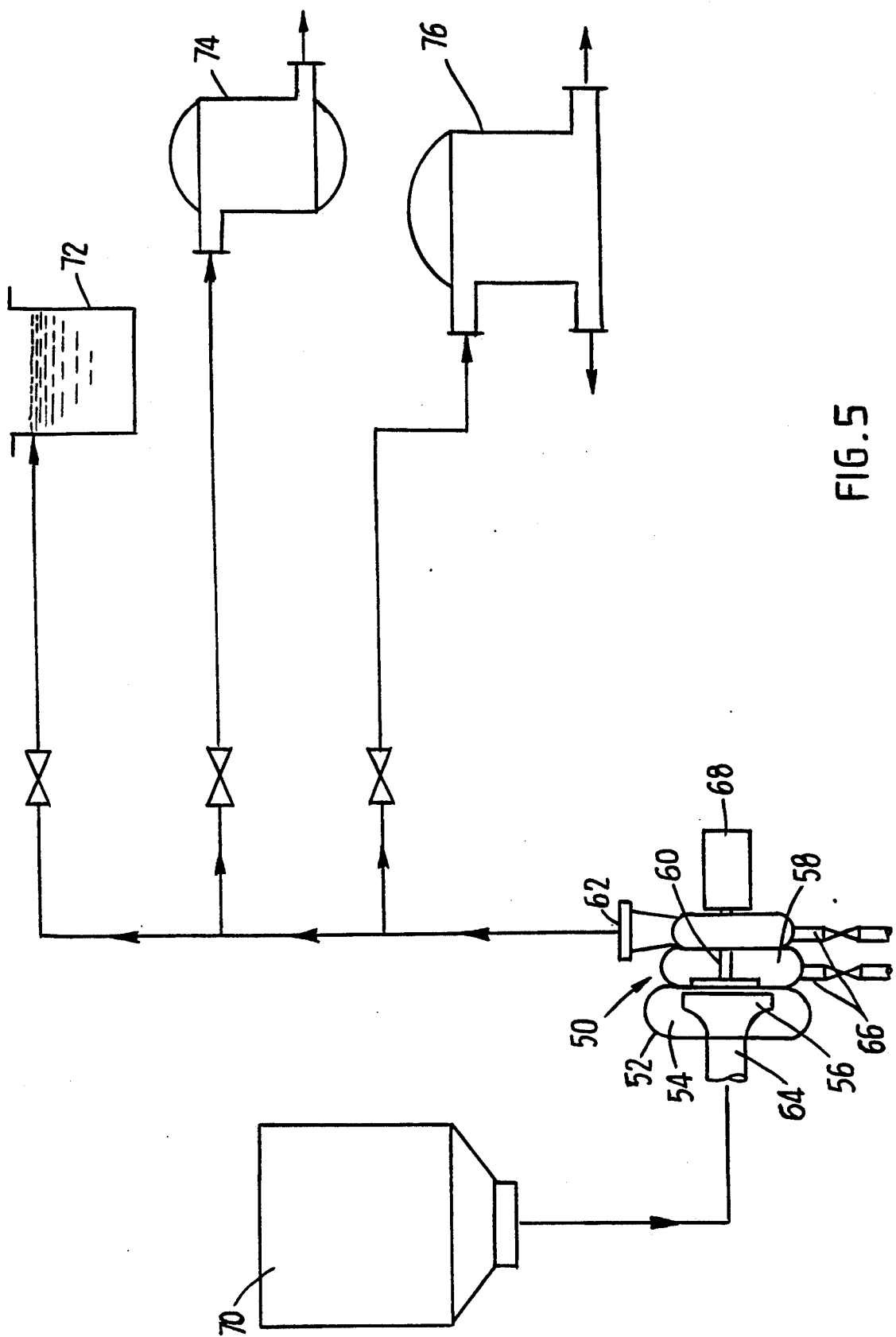
FIG. 5 illustrates a diagrammatic view of the preferred embodiment of FIG. 4 in cooperation with a pulper, a storage tank, a refiner and a screen.

In the following, a number of applications of the present invention are described. (see FIG. 5)

In pulping of waste paper, sand, metal and other impurities arrive in the pulper (70) with the waste paper. After pulping, the stock is usually pumped to another process step. However, when the method of the present invention of separating sand and scrap is applied to this pumping stage in the pulper (70), the problems which would otherwise be present during pumping are avoided.

A second application involves the feeding of stock by a pump to a screen (76). In the screen (76), there is a rotor rotating close to the screen surface and both the rotor and the screen surface would be heavily worn if sand and metal scrap were to enter the screen. By separating the sand and the scrap in the feed pump of the screen, the wear is greatly reduced.

A third application relates to the feeding of stock to a refiner (74). In a refiner (74), the stock is treated between two rotating metal blade surfaces. The pitch of the blades is often very small, even less than about 1 mm. It is apparent that the removal of scrap and sand in the feed pump of the refiner leads to a reduction in wear of the refiner blades.

A fourth application relates to the feeding of stock to a stock washer, a storage tank (72) or any other space in which the pulp flow rate is low. In this type of chamber, the heavy particles tend to settle at the bottom and will gradually clog the device. By separating the heavy particles in the feeding pump, the problems of clogging can be minimized.

One feature which is common to all the above applications is that the stock feed pump and the method of the present invention are used to eliminate or to reduce the wear and clogging problems caused by the presence of heavy particles in subsequent apparatus. Of course, these examples are for illustrative purposes, and no doubt, many more applications can be found in the pulp and paper industry.

As apparent from the above, the method and the apparatus of the present invention result in the elimination or minimization of the major disadvantages of a variety of prior art stock treatment systems. Use of the present invention renders these treatment systems easier to operate while remarkably increasing the life span of the devices utilized.

It should be understood that the preferred embodiments and examples described are for illustrative purposes only and are not to be construed as limiting the scope of the present invention which is properly delineated only in the appended claims.

We claim:

1. A method of separating heavy impurities from a fiber suspension, comprising:
   (a) introducing said fiber suspension with heavy impurities into a centrifugal pump;
   (b) causing a rotational movement of said fiber suspension with heavy impurities by circulating the fiber suspension with heavy impurities for at least two cycles within an interior chamber of said centrifugal pump for raising the pressure of said suspension and for separating said heavy impurities from said suspension by moving said heavy impurities toward the periphery of said chamber;
   (c) removing said heavy impurities from the periphery of said chamber; and
   (d) discharging said fiber suspension at a higher pressure than that of said fiber suspension when introduced into said pump in step a).

2. The method according to claim 1, further comprising the step of supplying said fiber suspension with heavy impurities from a pulper.

3. The method according to claim 1, further comprising the step of transferring said fiber suspension to a screen after step d).

4. The method according to claim 1, further comprising the step of transferring said fiber suspension to a refiner after step d).

5. The method according to claim 1, further comprising the step of transferring said fiber suspension to a storage tank after step d).

6. An apparatus for separating heavy impurities from a fiber suspension, comprising:
   (a) a pump housing having an interior peripheral surface, a longitudinal axis, a suction inlet opening, at least first and second annular portions which form a volute and a pressure outlet opening, wherein said volute formed by said first and second annular portions is disposed between said inlet opening and said pressure outlet opening;
   (b) a rotatable shaft disposed along said axis and within said pump housing, said volute being arranged to wind around said shaft for at least two complete cycles so that fiber suspension rotates at least 720 degrees between the inlet opening and the pressure outlet opening;
   (c) an impeller mounted on said shaft for rotation therewith and arranged in said first annular portion;
   (d) means for discharging said heavy impurities from a location proximate to the interior peripheral surface of said housing.

7. The apparatus according to claim 6, wherein said housing has a cross sectional area which diminishes towards said pressure outlet opening.

8. The apparatus according to claim 6, wherein said first annular portion has first diameter and said second annual portion has a second diameter and wherein said first diameter is greater than the second diameter.

* * * * *